United States Patent [19]
Conner, Jr.

[11] 3,771,477
[45] Nov. 13, 1973

[54] PUNCH-TAPE-CONTROLLED SEWING APPARATUS

[75] Inventor: William R. Conner, Jr., Shelbyville, Tenn.

[73] Assignee: Kellwood Company, St. Louis, Mo.

[22] Filed: Mar. 16, 1972

[21] Appl. No.: 235,253

[52] U.S. Cl. ............................ 112/121.12, 318/696
[51] Int. Cl. ............................................ D05b 21/00
[58] Field of Search .................. 112/2, 84, 86, 102, 112/118, 121.11, 121.12, 121.15; 310/49; 318/138, 685, 696, 699

[56] References Cited
UNITED STATES PATENTS

| | | | |
|---|---|---|---|
| 2,837,046 | 6/1958 | Carson et al. | 112/102 X |
| 3,329,109 | 7/1967 | Portnoff et al. | 112/121.12 |
| 3,385,245 | 5/1968 | Ramsey et al. | 112/121.12 |
| 3,497,780 | 2/1970 | Leenhouts | 318/138 |
| 3,626,269 | 12/1971 | Stanley | 318/696 |

*Primary Examiner*—Werner H. Schroeder
*Attorney*—Peter S. Gilster et al.

[57] ABSTRACT

Apparatus for automatically controlling movement of material for sewing by a sewing machine in response to a pattern determined by a punch tape. A positioning device whose movement is controlled along respective axes by a pair of stepping motors effects relative movement of the material to be sewed with respect to the sewing machine. Each of the stepping motors is of the type having a plurality of windings producing stepwise movement of the motor shaft when energized with alternate changes in polarity. A punch-tape reader detects uncoded perforations arranged in staggered sequence in channels of a punch tape with two channels controlling each axis of movement. The perforations define a predetermined pattern of movement by the positioning device. Solid-state control circuitry includes a plurality of flip-flops each interconnected with the tape reader and each switching from one stable state to its other stable state in response to detection by the tape reader of corresponding perforations in the tape to cause energization by the control circuitry of the windings with successive alternate changes in polarity. The arrangement provides automatic sewing of the material at high speed according to the predetermined pattern.

6 Claims, 7 Drawing Figures

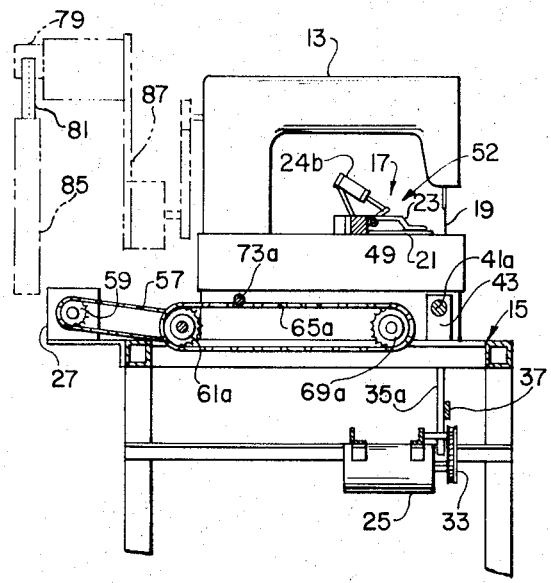
FIG.3
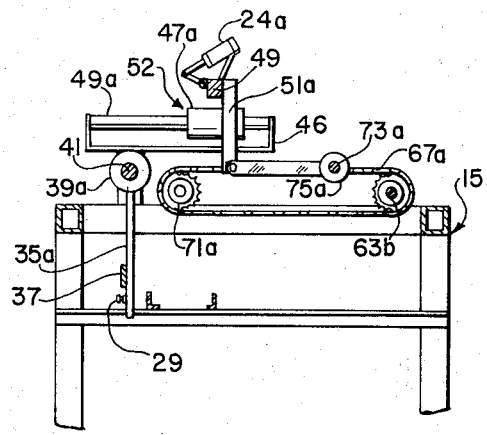
FIG.4
FIG.7
| | STEPPING MOTOR COIL | | | |
|---|---|---|---|---|
| | 89a | 89b | 91a | 91b |
| STEP 1 | X | | X | |
| STEP 2 | X | | | X |
| STEP 3 | | X | | X |
| STEP 4 | | X | X | |
| STEP 5 | X | | X | |
| STEP 6 (REVERSAL) | | X | X | |
| STEP 7 | | X | | X |
| STEP 8 | X | | | X |
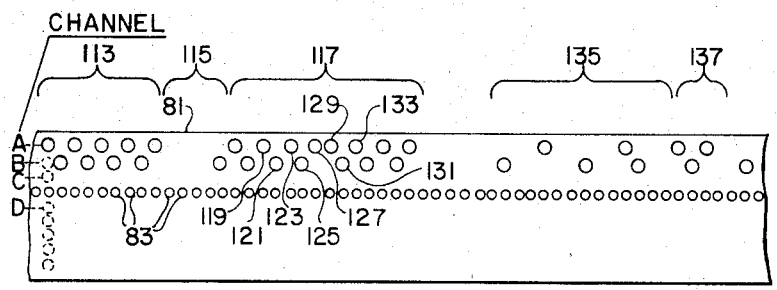
FIG.6

PUNCH-TAPE-CONTROLLED SEWING APPARATUS

BACKGROUND OF THE INVENTION

This invention relates generally to positioning or guidance systems under the control of a punch tape and more particularly to a system using coded punch tape and which automatically guides material for sewing by a sewing machine according to a predetermined pattern.

It has heretofore been proposed to employ stepping motors to position a workpiece-holding table or a machine tool or the like according to certain numeric codes punched into a conventional multichannel punch tape. Thus, the stepping motors may be started at a fixed speed in one direction when a "start" code is detected and stopped when a "stop" code is detected. Even this simple positioning has required the use of a special decoder or so-called processor for use with the tape reader. The processor decodes the logic of the code and converts it to electrical signals of a form useful for controlling one or more stepping motors. Systems using this technique are shown, for example, in U.S. Pat. Nos. 3,414,785, 3,297,929, 2,937,258 and 2,741,732. Decoding of a punch tape for stepping motor controls is disclosed also in U.S. Pat. No. 2,750,548.

The use of coded punch tapes may permit certain control flexibility. However, punch-tape codes as heretofore used for positioning or the like may be difficult to "read" or understand upon visual inspection of the tape, as is sometimes required. Also, the punch codes typically and inefficiently occupy numerous channels of the punch tape even though it would be desirable to use some of those channels for other control functions. In any event, the encoding and decoding of punch tapes may be quite complex (involving complex electronic decoding circuitry) where it is desired to continuously control and vary the movement of the machine tool or holding table, etc., during a cycle of operation, as distinguished from merely prepositioning the tool or table or the like.

Stepping motor control using a belt with perforations which are not actually in coded form has been suggested. For example, U.S. Pat. No. 2,774,922 describes a control system which causes successive energization of thyratrons of the windings of a specially configured stepping motor in response to sequential contacts on the belt. However, this type of control is not useful with any of the various typically commercially available types of stepping motor which have pairs of phase windings which must be energized with successive changes in polarity, i.e., which require that the polarity of energization of each of two windings be reversed in succession.

SUMMARY OF THE INVENTION

Among the several objects of the invention may be noted the provision of automatic sewing apparatus; the provision of such apparatus which is punch-tape controlled and which carries out automatic, high-speed sewing of material according to a predetermined pattern defined by the punch tape; the provision of such apparatus having novel punch-tape-controlled positioning apparatus; the provision of such positioning apparatus utilizing stepping motors for positiong control; the provision of such positioning apparatus in which the punch tape includes perforations which are not in numerically coded form, required no complicated decoding for control of the stepping motors, and yet which is easily read or understood upon visual inspection; the provision of such positioning apparatus wherein the speed and direction of the stepping motors is quickly and simply altered under continuous control of the punch tape; the provision of such positioning apparatus utilizing commercially available stepping motors of the type having windings which are energized with successive changes in polarity; and the provision of such sewing and positioning apparatus which is easily, simply, and economically constructed. Other objects and features will be in part apparent and in part pointed out hereinafter.

Briefly, punch-tape-controlled sewing apparatus of the present invention includes a sewing machine and a positioning or feed arrangement for effecting relative movement of material with respect to the sewing machine along two possible axes of movement for sewing of the material by the sewing machine. The apparatus includes a pair of stepping motors each controlling movement by said positioning means along a corresponding one of said axes of movement. Each stepping motor has a pair of windings and a shaft interconnected with the positioning arrangement and adapted to rotate with stepwise movement when the windings of the respective motor are energized with successive alternate changes in polarity. A punch-tape reader of the system detects successive perforations arranged in a staggered sequence in a punch tape, rather than in a numeric code as heretofore typically employed. The perforations define a predetermined pattern of movement by the positioning means. A pair of the punch-tape channels corresponds to each of the said axes of movement. Control circuitry of the invention for energizing the windings includes a plurality of bistable switching means (flip-flops) interconnected with the tape reader. The flip-flops each have a pair of stable states and switch alternately from one state to another in response to successive detection of corresponding perforations in the punch tape by the tape reader, causing successive alternate changes in polarity of the stepping motor windings so as to cause high-speed automatic sewing of the material according to the predetermined pattern defined by the punch-tape perforations. The punch tape is preferably driven directly by the sewing machine.

BRIEF DESCRIPTION OF THE DRAWINGS

FIGS. 3 and 4 are cross-sectional views of the apparatus taken along lines 3—3 and 4—4, respectively, of FIGS. 1 and 2;

FIG. 6 is a view of a length of punch tape showing punch perforations in the tape which determine certain stepping motor operation in accordance with the invention; and FIG. 7 is a table illustrating a certain sequence in which stepping motor windings are energized by the circuitry of FIG. 5.

DESCRIPTION OF THE PREFERRED EMBODIMENT

Figure 1:
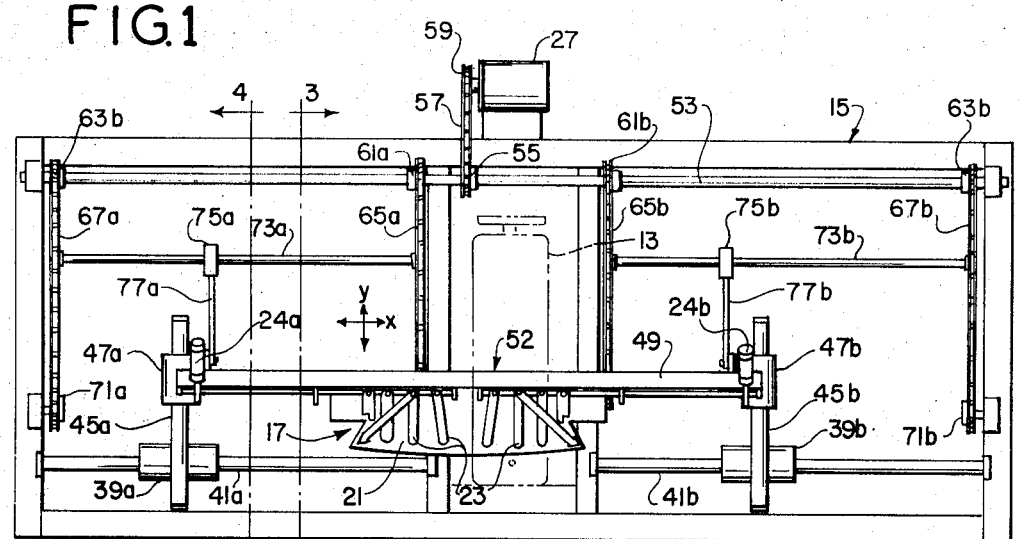
FIGS. 1 and 2 are top and side elevations, respectively, of punch-tape-controlled sewing apparatus of the invention.
Figure 2:
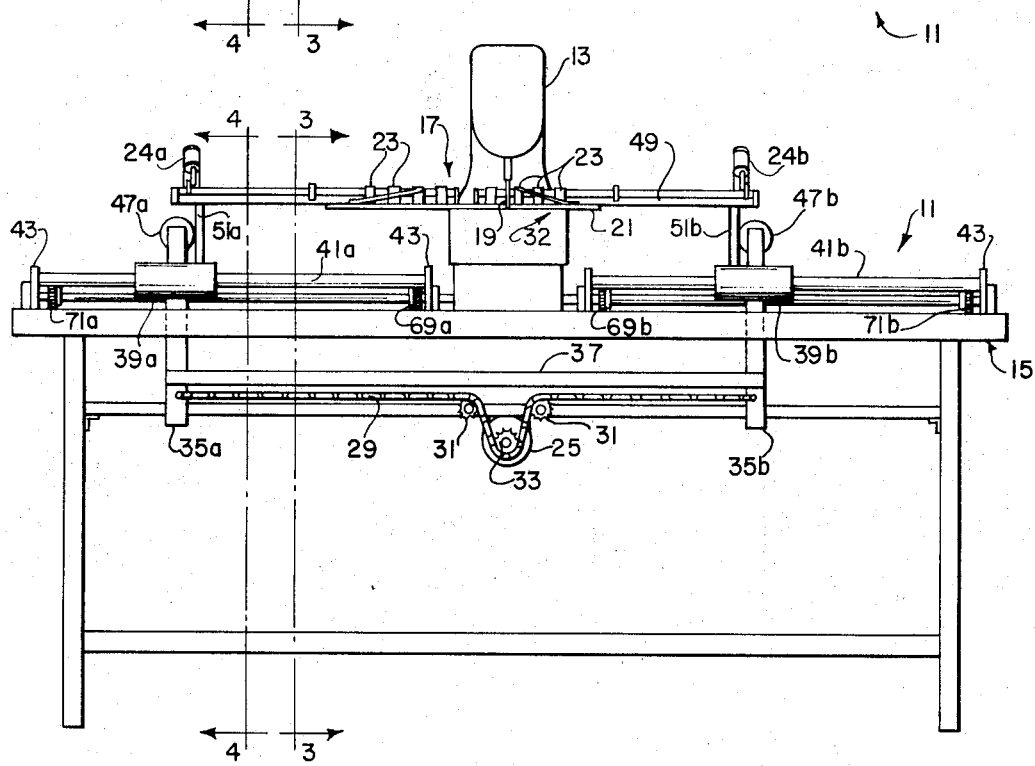

Referring now to the drawings, sewing apparatus of the present invention is designated generally by the reference numeral 11 and is adapted for automatic high-speed sewing under the control of a punch tape. The apparatus includes a sewing machine 13 (shown in phantom in FIG. 1 for clarity) of a conventional electrically driven industrial type. Sewing machine 13 is suitably mounted on and supported by a frame 15. As illustrated, the apparatus is especially configured for automatically sewing a shirt collar profile, i.e., along the margin of layers of shirt collar material. Of course, it will be understood that a variety of different patterns can be sewn by the apparatus on fabric or other materials.

The apparatus comprises a positioning means including a clamp indicated generally at 17 for clamping and effecting relative movement of material to be sewn (e.g., layers of shirt collar fabric) with respect to the needle 19 of sewing machine 13. Movement of the clamp for this positioning purpose according to a predetermined pattern is determined by a punch tape. The positioning clamp 17 comprises a table 21 for supporting the layers of fabric to be sewn and several clamp elements or fingers 23. Fingers 23 are hinged in sets and are adapted to be raised for placing fabric on table 21 or to be lowered for clamping fabric against the table by a pair of small air cylinders 24a and 24b. The table 21 and fingers 23 are movable as a unit either longitudinally along an X-axis or laterally along a Y-axis with respect to frame 15 and sewing machine 13. These axes are so designated in FIG. 1.

Movement of clamp 17 along the X-axis is effected by operation of a stepping motor 25 and along the Y-axis by a stepping motor 27. A length of chain belt 29 passing over idler sprockets 31 and around a sprocket 33 carried on the shaft of stepping motor 25 is secured at opposite ends to respective arms 35a and 35b. Arms 35a and 35b, which are maintained in spaced relationship by a brace 37 between them, extend downwardly from respective so-called ball bushings 39a and 39b. Each of these ball bushings constitutes a slider bearing assembly adapted to slide freely and linearly along a respective circular rod 41a, 41b (each such rod constituting a linear bearing surface). Each of rods 41a and 41b is secured at opposite ends to frame 15 by brackets 43 for linear movement of bushings 39a and 39b along the X-axis.

Bushings 39a and 39b carry transversely oriented rods 45a and 45b by means of bracket structure 46 (FIG. 4). Ball bushings 47a and 47b (similar to bushings 39a and 39b) constitute sliders adapted to slide linearly back and forth along rods 45a and 45b respectively (these rods constituting linear bearing surfaces), and thus along the Y-axis. A bar 49 extends between bushings 47a, 47b, each end of the bar being secured by a respective arm 51a, 51b to bushings 47a and 47b, respectively. Bar 49 carries clamp 17 and is adapted to be moved back and forth along the Y-axis parallel to the X-axis through operation of stepping motor 27. Bar 49, clamp 17 and its associated subassemblies, and bushings 47a, 47b together may be regarded as a carriage designated generally 52, the entire carriage being movable along either axis.

For the purpose of moving the carriage along the Y-axis, a shaft 53 extending longitudinally along the length of frame 15 is journalled at its ends to the frame. A sprocket 55 on shaft 53 is driven via a chain belt 57 from a drive sprocket 59 on the output shaft of stepping motor 27. Shaft 53 carries four drive sprockets 61a, 61b and 63a, 63b around which pass respective chain belts 65a, 65b and 67a, 67b. The belts are tensioned by respective idlers 69a, 69b and 71a, 71b. Rods 73a and 73b are carried between pairs of these chain belts. I.e, the ends of rod 73a are connected to belts 65a and 67a, respectively, while the ends of rod 73b are connected to belts 65b and 67b, respectively. Thus rods 73a and 73b are together shifted along the Y-axis by operation of stepping motor 27. Each of rods 73a, 73b has on it a respective ball joint rod end bearing 75a, 75b adapted to slide freely along the respective rod. Respective links 77a, 77b interconnect the bearings 75a, 75b with arms 51a, 51b.

Accordingly, when shifted along the X-axis, carriage 52 is maintained in parallel relationship with the X-axis since bearings 75a, 75b slide freely along the respective bars 73a, 73b upon shifting of the carriage. However, upon rotation of the output shaft of motor 27, chains 65a, 65b and 67a, 67b shift rods 73a, 73b in a direction corresponding to the rotation direction of the output shaft of motor 27. Thus carriage 52 is shifted along the Y-axis through operation of motor 27.

Means is employed for detecting perforations in the channels of a punch tape in order to define a predetermined pattern of movement for fabric clamp 17. For this purpose, there is illustrated in outline in FIG. 3 at 79 a conventional photoelectric punch tape reader of a type suitable for reading an eight-channel punch tape 81. A length of punch tape 81 is shown in FIG. 6, apertures being shown in only two of the eight channels. Tape reader 79 includes the usual drive sprocket or the like for engaging smaller apertures 83 of the punch tape to drive it through the tape reader for detecting of the punched apertures by photocell elements. The punch tape may be in the form of an endless loop (the sewing pattern defined by the punch pattern being thereby readily repeated) protected by a so-called tumble box 85. The tape reader drive means is connected for being operated by the drive shaft of sewing machine 13 so as to cause the punch tape to pass through reader 79 at a speed which varies as a predetermined function of the sewing machine's speed. For this purpose, reader 79 is interconnected with the sewing machine by suitable speed reduction belts or chains 87, etc., such that the punch tape is advanced preferably five steps for each stitch taken by sewing machine 13.

Each of stepping motors 25, 27 is of the commercially available type having a plurality of windings (such as two windings), the rotor shaft of the motor being adapted to rotate with stepwise movements when the windings are energized with successive sequential changes in polarity. I.e., and as will be understood by those skilled in the art, a stepwise movement of the motor's shaft occurs when the polarity of a first one of the windings is reversed while maintaining the same polarization of the second winding. Then another stepwise movement in the same direction occurs by reversing the polarity of the second winding while maintaining the same polarization of the first winding, and so on. To reverse the direction of shaft rotation, the windings are energized with a reversed sequence of successive alternate changes in polarity. I.e., one of the windings has its polarity reversed twice in succession without an intervening reversal of the polarity of the other winding.

Figure 5:
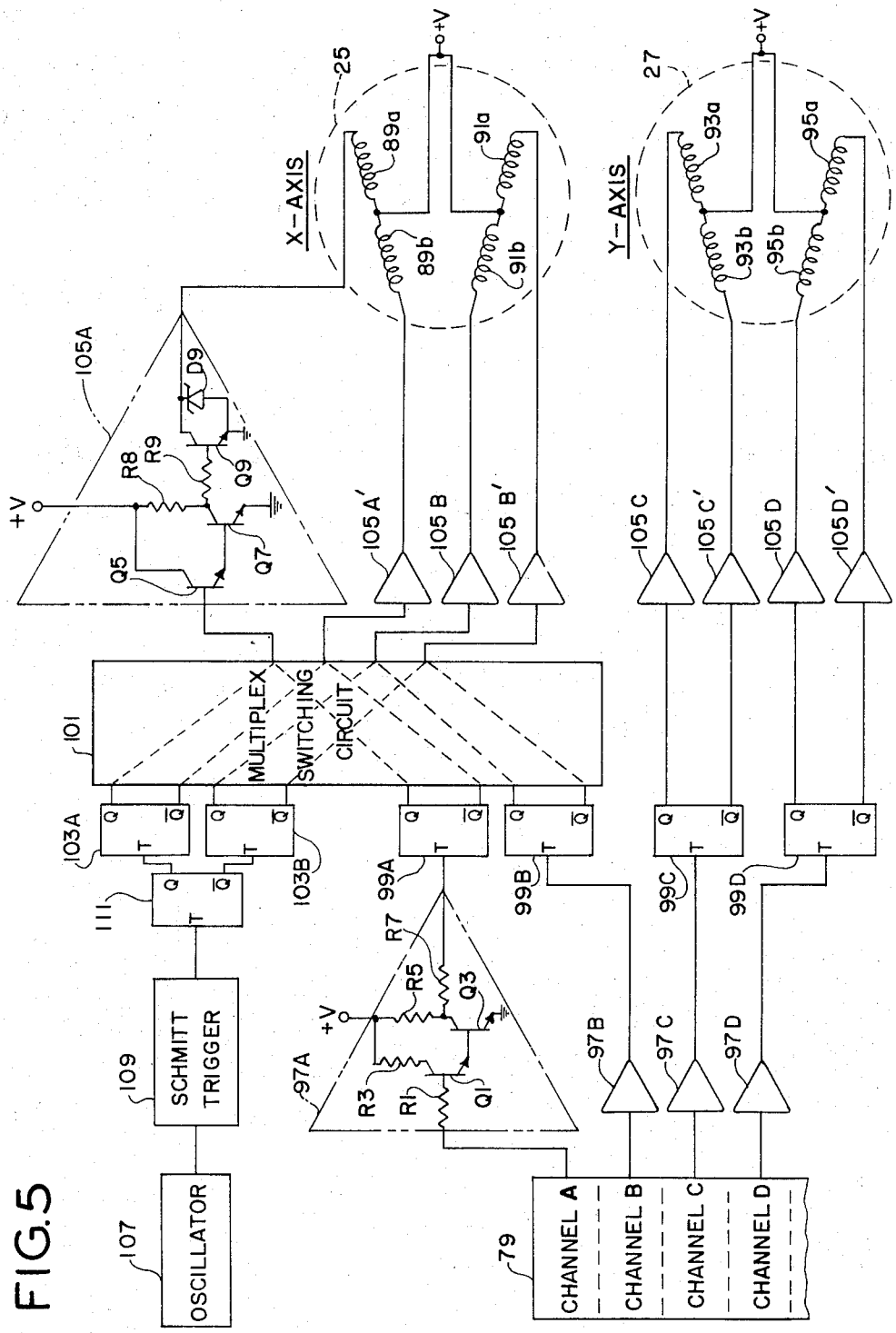
FIG. 5 is a schematic circuit diagram of certain stepping motor control circuitry of the invention.

Preferably, stepping motors 25 and 27 are each of a so-called bifilar type having two windings each of two halves. That is, each winding has two sections or coils wound in opposite directions. Referring to FIG. 5, stepping motor 25 (whose shaft controls movement along the X-axis as represented in FIG. 1) has a first winding with two coils or sections 89a, 89b and a second winding with sections 91a, 91b. Similarly, a first winding of motor 27 (controlling movement along the Y-axis) includes sections 93a, 93b and the other winding includes sections 95a, 95b. Each half or section of a winding is adapted, when energized, to polarize the respective winding in one direction. The halves of each winding are alternately energized for alternately polarizing the winding. Each of the stepping motors preferably provides 200 steps per rotation of its rotor shaft, the drive ratio being such that clamp 17 moves one inch for each fifty steps of one of the stepping motor shafts.

Circuitry for controlling energization of the windings of motors 25 and 27 is schematically diagrammed in FIG. 5. Four channels A-D of tape reader 79, each including a photocell or the like, detect punch perforations in four of the eight channels of punch tape 81. The remaining four channels of the punch tape may advantageously be used for controlling various other operational aspects of the present sewing system (such as control along a third axis) or starting and stopping of sewing machine 13 and so forth.

There are a pair of channels of the punch tape corresponding to each of the two axes of movement of clamp 17. That is, channels A and B of tape reader 79 detect apertures arranged in an uncoded, staggered sequence in the first two channels of punch tape 81 for controlling movement along the X-axis. Channels C and D of the tape reader detect similarly uncoded apertures arranged in a staggered sequence in the second two channels of the punch tape to control movement along the Y-axis. This staggered aperture arrangement is explained later as to its effect or operation.

Each of channels A-D of tape reader 79 is adapted to supply a signal when its photocell (or other photoelectric element) detects an aperture in the corresponding channel of the punch tape. The signals are supplied to respective switching-type amplifiers 97A-97D. Each of amplifiers 97B-97D is identical with amplifier 97A shown in detail. Signals from tape reader channel A are supplied through a resistor R1 to the base of an NPN transistor Q1 which is Darlington-coupled to a further NPN transistor Q3. A supply voltage +V is supplied to the collectors of these two transistors through respective resistors R3 and R5.

The amplified output signal is supplied through a resistor R7 to the toggle (or clock) input of a flip-flop 99A. Amplifiers 97B-97D similarly supply amplified signals to respective flip-flops 99B-99D. The conventional power supply connections for these flip-flops, and for certain other portions of the circuitry, are not shown in order to simplify the drawings.

As is known to those in the electronics arts, a flip-flop constitutes a bistable device having a pair of stable states. Such a device is adapted to be switched alternately from one state to the other. I.e., each of flip-flops 99A-99D switches, when toggled, from a state in which one of its outputs ("Q" or "$\overline{Q}$") is "high" and the other "low" to a state in which the former is "low" and the latter "high." The flip-flops are preferably of a commercially available integrated circuit type.

Interconnected with the outputs of flip-flops 99A and 99B is a switching circuit 101. The latter preferably comprises a so-called multiplexer of an integrated circuit variety adapted to provide internal selective connection of either a first set of inputs (e.g., those with which flip-flops 99A, 99B are interconnected) or a second set of inputs (with which further flip-flops 103A, 103B are interconnected) to respective outputs in response to a suitable control voltage supplied by appropriate leads, etc. (not shown), to the multiplexer.

Thus in one switching mode multiplexer 101 is adapted to interconnect the outputs of flip-flops 99A, 99B with respective amplifiers 105A, 105A', 105B and 105B' whose outputs are interconnected with winding sections 89a, 89b, 91b and 91a, respectively, of stepping motor 25 (as indicated by dashed lines). Amplifiers 105C, 105C', 105D and 105D' directly interconnect the outputs of flip-flops 99C and 99D with sections 93a, 93b, 95b and 95a, respectively, of stepping motor 27.

Amplifiers 105A, 105A', etc., are identical and of a switching type. Only amplifier 105A is shown in detail and includes an NPN transistor Q5 to the base of which is supplied (by multiplexer 101) the output signal from the "Q" output of flip-flop 99A. Transistor Q5 is Darlington-connected to a further NPN transistor Q7 whose collector is supplied with a supply voltage +V through a load resistor R8 and is interconnected through a current-limiting resistor R9 with the base of an NPN power switching transistor Q9. A zener diode D1 is connected across the collector and emitter terminals of transistor Q9. The emitter of transistor Q9 is grounded and its collector is interconnected with one end of motor winding section 89a.

The interconnections of the winding sections or coils of motors 25 and 27 are each provided with the supply potential +V. Thus each such section (e.g., 89a) is energized when the power switching transistor (e.g., Q9) of the associated amplifier 105A, 105A', etc., is driven into saturation.

Flip-flops 103A and 103B constitute a portion of slew circuitry for causing slewing movement of clamp 17 along the X-axis (as for prepositioning, etc.) through operation of stepping motor 25 without regard to the operation of tape reader 79 (and thus independently of the punch tape). This slew means includes an oscillator 107 (which may operate at a frequency of several hundred hertz) and a Schmitt trigger circuit 109 (preferably of an integrated circuit type) adapted for being triggered by the output signal from oscillator 107. Thus Schmitt trigger 107 supplies an output signal of a periodic waveform in synchronism with oscillator 107. This periodic output signal is supplied to a flip-flop 111 for toggling the latter, whose "Q" and "$\overline{Q}$" outputs are interconnected with the clock (toggle) inputs of flip-flops 103A and 103B. Thus, with each cycle of the output signal from oscillator 107, flip-flop 111 changes its state thereby to cause alternate toggling of flip-flops 103A and 103B.

In one of its switching modes (as determined by the presence of a proper control voltage), switching circuit 101 interconnects the "Q" and "$\overline{Q}$" outputs of flip-flops 103A and 103B with the inputs of amplifier 105A, 105A′, 105B and 105B′, respectively, as illustrated by dashed lines. In this mode, circuit 101 does not interconnect the latter amplifiers with flip-flops 103A and 103B, of course.

It should be noted that slew circuitry similar to that described above may be provided for slewing movement of clamp 17 along the Y-axis.

In operation, the circuitry of FIG. 5 is provided with suitable power supply potentials. Start and stop control of sewing machine 13 may be assumed to be manually controlled, although it will be apparent that one of the channels of punch tape 81 not having to do with operation of the FIG. 5 circuitry per se may have apertures which have to do with this function. In any case, operation of sewing machine 13 causes movement of punch tape 81 through tape reader 79 at a speed proportional to that of the sewing machine.

Referring to FIG. 6, the channels of punch tape 81 corresponding with channels A-D of tape reader 79 are designated as such. Since operation of stepping motors 25 and 27 under control of punch tape 81 is carried out in the same way, only apertures in channels A and B, controlling the X-axis stepping motor 25, have been shown. It will be understood that the provision of apertures in tape channels C and D controls operation of the Y-axis stepping motor 27.

Tape 81 may be assumed to pass through tape reader 79 from left to right such that apertures in the channels pass by the respective photocells (or other aperture detector means of the reader) one at a time, each photocell causing a signal to be delivered to a respective one of amplifiers 97A–97D as an aperture is detected in the corresponding one of tape channels A-D.

The apertures are staggered between the first and second channels, i.e., A and B, of tape 81. A first group of apertures designated 113 are closely spaced, the spacing corresponding with that of drive apertures 83. There are eight apertures of group 113 defining eight rotational stepping movements of the output shaft of motor 25 to produce shifting of clamp 17 along the X-axis during sewing by sewing machine 13 of material clamped between clamp fingers 23 and clamp table 21.

Aperture group 113 is followed by an aperture-free interval 115 of the tape during which stepping motor 25 is not operated, thus producing no movement of clamp 17 along the X-axis during continued operation of sewing machine 13. The aperture-free interval 115 is followed by a further group of apertures 117 during which operation of stepping motor 25 is resumed as the sewing machine continues to operate.

In accordance with this invention, the stepping speed of the stepping motors is varied as a function of the interval between successively detected perforations or apertures of the punch tape, assuming a particular speed for sewing machine B. Stated differently, the interval between successively detected perforations determines the extent of movement (if any) for clamp 17 along the X or Y-axis with respect to each stitch taken by the sewing machine.

As an aperture, i.e., perforation, is detected by reader 79 in a channel of the tape, a signal is transmitted to the respective switching amplifier 97A–97D. Considering, for example, the tape aperture indicated in FIG. 6 at 119, channel A of reader 79 supplied a signal to amplifier 97A causing transistor Q1 to become conductive and transistor Q3 to become cut off. Thus the output of amplifier 97A goes "high" to cause toggling of flip-flop 99A. If it is assumed that the "$\bar{Q}$" terminal of flip-flop 99A had previously been "high" and the "Q" terminal "low," such toggling changes the state of the flip-flop, now causing the "Q" output to become "high" and the "$\bar{Q}$" output to become "low." It may initially be assumed also that the "Q" output of flip-flop 99B is high (the "$\bar{Q}$" output being correspondingly low).

Further assuming that switching circuit 101 interconnects the outputs of flip-flops 99A and 99B with respective switching amplifiers 105A, 105A′ and 105B, 105B′, then the result of the detected aperture 119 in channel A of the punch tape is that transistor Q5 of amplifier 105A becomes conductive, transistor Q7 nonconductive, and transistor Q9 conductive, thereby to energize coil 89a of stepping motor 25. However, as will be apparent, amplifier 105A′ does not energize coil 89b. Thus also, coil 91b of the stepping motor is energized but coil 91a is not. Accordingly, stepping motor 25 is advanced one step in the clockwise direction. This condition resulting upon detection of aperture 119 is depicted in tabular form in FIG. 7, wherein the first step is indicated by the legend "STEP 1." The energization of coils 89a and 91b is depicted by a respective "X" in the appropriate column.

The next step is produced by detection of an aperture 121 in channel B of the punch tape by reader 79. The resultant output signal from amplifier 97B causes toggling of flip-flop 99B, thus reversing the polarity of the second winding of stepping motor 25 by deenergizing coil 91b and energizing coil 91a. This produces a second clockwise stepping movement of the output shaft of motor 25, as shown in FIG. 7.

As subsequent apertures, staggered successively between channels A and B, are detected, the windings of stepping motor 25 are energized with successive sequential changes in polarity. Thus apertures 123, 125 and 127 produce third, fourth and fifth clockwise steps of the stepping motor's shaft, as depicted in FIG. 7.

The next aperture as indicated at 129 represents a reversal of the sequence of aperture staggering causing flip-flop 99B to be toggled twice in succession, thus causing the windings of motor 25 to be energized with a reversed sequence of successive alternate changes in polarity. Thus the rotation of the motor shaft is reversed upon its sixth step as shown in FIG. 7. In other words, to reverse the motor direction, it is necessary only to provide successive apertures in one channel of the punch tape, without an intervening aperture in the other channel corresponding to the respective stepping motor.

If the staggering of the apertures is now continued, the motor shaft continues stepping movements in the reversed direction, i.e., counterclockwise. Thus, seventh and eighth steps (shown in Fig. 7) are produced by apertures such as indicated at 131 and 133, respectively.

Apertures which are spaced out, such as those indicated at 135, produce fewer steps per unit length of the punch tape. That is, the stepping motor shaft speed varies as a function of the interval between detected perforations of the punch tape. Hence, there is less movement of clamp 17 in response to perforations of interval 135 than for interval 117. Another group of perforations or apertures 137 provides increased speed of clamp movement, all as will be apparent. It will be understood, of course, that apertures are similarly provided in tape channels C and D for control of the Y-axis stepping motor 27.

Thus it is seen that the movement of clamp 17 as to both extent and direction and along either axis of control is precisely controlled by the punch tape 81. In this way, the punch tape defines a pattern of movement for clamp 17 for sewing of the material clamped thereby by sewing machine 13. Preferably, as noted, the punch tape is endless, facilitating repetition of the sewing pattern.

In sewing of shirt collar profiles, the fabric is placed under clamp fingers 23 on clamp table 21 and the clamp cylinders 24c and 24b are suitably actuated to firmly clamp the material. For such sewing, it is preferred that the clamp 17 be slewed from one side position along the X-axis by operation of the slew circuitry to a starting position at one end of the collar pattern from which sewing begins, is continued around the pattern, and is then terminated at the other end of the pattern. The clamp is then slewed to an opposite side position and the sewn fabric is removed. The operation is then carried out for sewing another pattern with the clamp moving in the opposite direction along the X-axis.

During such slewing steps of the operation, movement of stepping motor 25 is under the control of the slew circuitry. Referring once again to FIG. 5, oscillator 107 of this slew circuitry provides an output signal of periodic waveform which is effectively squared up and suitably shaped by Schmitt trigger 109 for toggling of flip-flop 111. The latter alternately toggles flip-flops 103A and 103B, just as the staggered perforations of the punch tape cause alternate toggling of flip-flops 99A and 99B. Through operation of switching circuit 101, toggling of flip-flops 103A, 103B causes alternate polarization of the windings of stepping motor 25 by amplifiers 105A, 105A', et cetera.

Certain significant advantages of the invention may be noted. Since the punch tape perforations are not coded, but instead directly control fabric positioning, there is no need for complicated, expensive decoding equipment as heretofore used for punch tape-controlled positioning. Moreover, the absence of perforation codes simplifies visual comprehension. Since each perforation defines a stepping movement, direction reversals being indicated by consecutive nonstaggered perforations, and since the spacing between perforations determines precisely the extent of clamp movement for each stitch taken by the sewing machine, accurate determination of pattern variations and adjustments in machine operation or the like are readily facilitated from visual inspection of the tape.

A further advantage of the invention is that, by the staggering of punch tape perforations between a pair of channels, the photocells, etc. of the respective tape reader channels need only operate at half the reading speed which would be required if it were necessary during normal stepping operation to read successive, non-staggered perforations in the same channel. Thus also, the electronic components associated with each channel are normally required to operate at half the speed that would otherwise be required. As a consequence, overall higher stitching speed is achieved with the present apparatus without compromise in reliability and without high tolerance or special high performance components.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Punch-tape controlled sewing apparatus comprising:
    a sewing machine;
    positioning means for effecting relative movement of material with respect to said sewing machine along at least two possible axes of movement for sewing of said material by said sewing machine;
    first and second stepping motors each having a plurality of windings and a shaft interconnected with said positioning means and adapted to rotate with stepwise movements when the windings are energized with successive sequential changes in polarity, each shaft controlling movement of said positioning means along a corresponding one of said axes of movement;
    a punch tape reader for detecting uncoded perforations progressively arranged in predetermined sequence in a plurality of channels of a punch tape, said perforations defining a predetermined pattern of movement by said positioning means, there being a pair of said channels corresponding to each of said axes of movement; and
    control means interconnected with said tape reader and comprising a pair of flip-flops for energizing the windings of each motor, each flip-flop having two stable states for maintaining a respective winding of each respective motor energized, each pair of flip-flops being responsive to detection of a certain pattern of perforations in a respective pair of tape channels to alternately be switched between said two stable states and alternately change the polarity with which the windings of the respective motor are energized whereby successive stepwise positioning movements of each motor shaft are controlled by the punch tape read by said punch tape reader and the shafts of each motor are held stationary except during stepping and whereby said material is automatically and accurately sewed at high speed by the sewing machine according to said predetermined pattern.

2. Sewing apparatus as set forth in claim 1 wherein each of said flip-flops has a pair of output terminals each delivering a signal which is a function of the state of the respective flip-flop, and wherein such stepping motor includes two windings, each winding having two sections for opposite polarization of the respective winding, said control means further including a plurality of switching amplifiers each interconnected between a respective one of said output terminals and a respective stepping motor winding section.

3. Sewing apparatus as set forth in claim 2 further comprising slew means for causing slewing operation of at least one of said stepping motors for producing slewing movement of the positioning means independently of operation of said tape reader, said slew means including an oscillator and a further flip-flop adapted for switching alternately between each of two stable states in response to operation of said oscillator, and an additional pair of flip-flops adapted for interconnection with the windings of a stepping motor, said further flip-flop being toggled in response to an output signal from said oscillator, said further flip-flop alternately toggling said additional pair of flip-flops.

4. Sewing apparatus as set forth in claim 3, said slew means further comprising a Schmitt trigger interconnected between said oscillator and said further flip-flop, and multiplex switching means for selectively interconnecting said additional pair of flip-flops with the stepping motor windings.

5. Sewing apparatus as set forth in claim 4 wherein each of the stepping motors is reversible in response to one of its respective pair of flip-flops energizing one winding thereof twice in sequence without intervening energization of the other of said windings by the other one of said pair of flip-flops.

6. Sewing apparatus as set forth in claim 5 further comprising means interconnected with said sewing machine for causing a punch tape to pass through said punch tape reader at a speed which varies as a predetermined function of the speed of the sewing machine, and wherein said positioning means comprises a clamp for clamping said material for sewing by said sewing machine, first drive means interconnected with the shaft of the first stepping motor for effecting transverse movement of the clamp, and second drive means interconnected with the shaft of the second stepping motor for effecting longitudinal movement of the clamp, and wherein said clamp comprises a table for supporting the material to be sewn and clamp elements for clamping the material against said table, and wherein said first and second drive means each comprise a linear bearing surface, slider means, a belt interconnected with said slider means and driven by the respective shaft of said first and second stepping motors for effecting linear sliding movement of said slider means along said linear bearing surface in response to rotation of the respective stepping motor shaft.

* * * * *